UNITED STATES PATENT OFFICE.

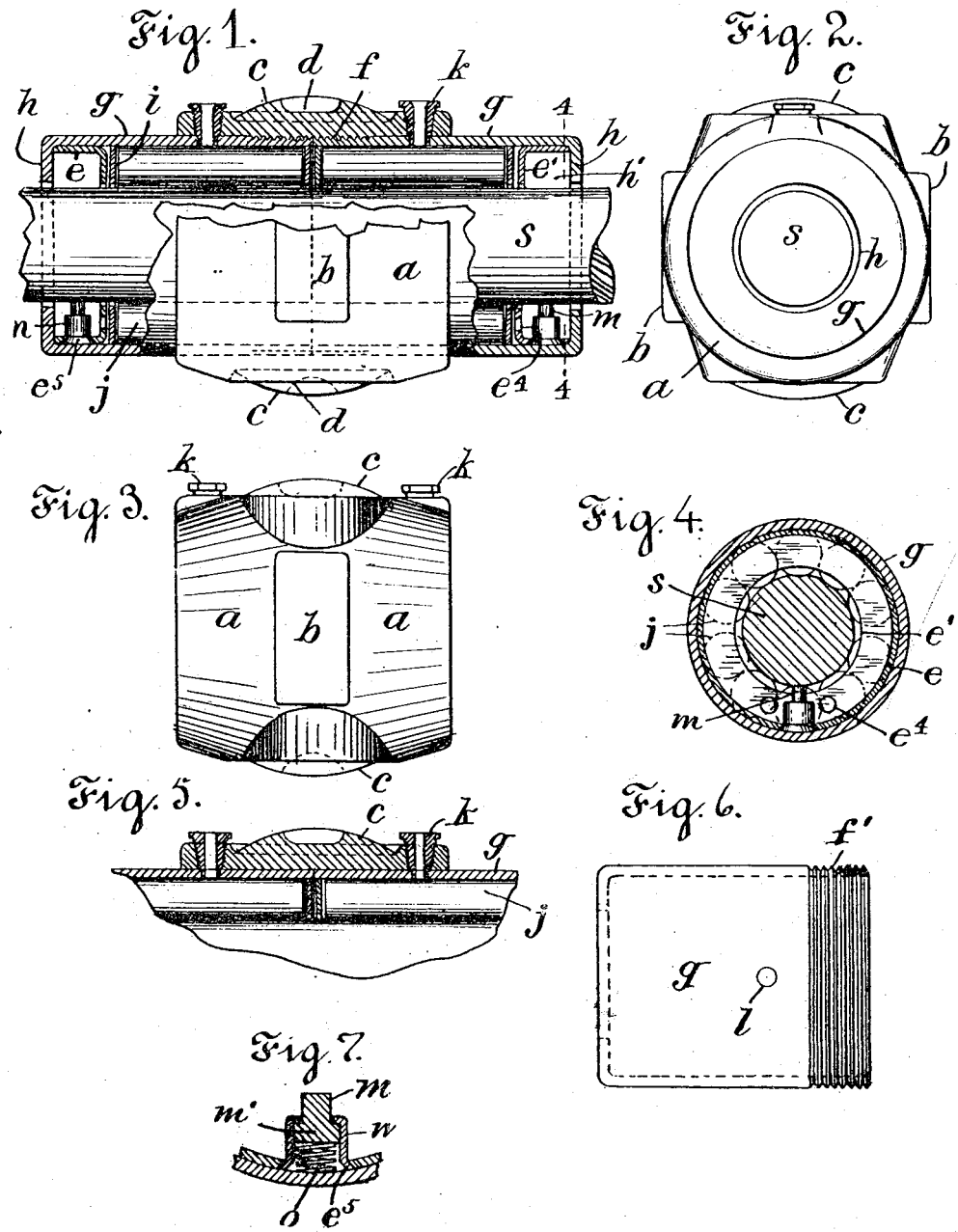

CHARLES S. LOCKWOOD, OF NEWARK, NEW JERSEY, ASSIGNOR TO HYATT ROLLER BEARING COMPANY, OF NEWARK, NEW JERSEY, A CORPORATION OF NEW JERSEY.

ROLLER-BEARING HANGER-BOX.

1,114,777.  Specification of Letters Patent. Patented Oct. 27, 1914.

Application filed January 24, 1914. Serial No. 814,016.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearing Hanger-Boxes, fully described and represented in the following specification and the accompanying drawings, forming a part of the same.

This invention relates to a hanger-box to contain anti-friction rolls for supporting a rotating shaft, such rolls being usually accompanied by a cage which holds the rolls together before insertion in the hanger-box, and which guides them when placed therein by contact with flanges at or near opposite ends of the box.

The invention is especially applicable to what are termed "solid boxes" into which the shaft must be inserted endwise.

The object of the invention is to furnish a construction for such a roller-bearing hanger-box by which no rivets, welds, or other fastenings are required to make the box complete for use in a hanger, and this object is attained by forming a central saddle with bore adapted to receive a sheet-metal casing, by pressing or screwing the casing into the saddle. The rolls rotate directly within such sheet-metal casing.

The complete structure embraces a shell having a collar forced within each end and carrying a spring-wiper-block to keep oil from working out of the casing, each collar having an annular flange to guide the adjacent end of the roll-cage. The end of the casing may be formed with integral inwardly turned flanges by making the casing of two sheet-metal shells open at their inner ends into which a cage containing a set of rolls can be inserted, the open ends of the shells being fitted into contiguity within the saddle, by pressing or screwing them therein.

To avoid possibility of any displacement of the shells within the saddle, an oil-hole bushing may be screwed through the side of the saddle into a hole formed in the shell. In the case of a threaded shell this prevents the rotation of the shell, and in case of one merely pressed into the saddle, it prevents any tendency to loosen or escape.

The invention will be understood by reference to the annexed drawing, in which—

Figure 1 is an elevation of the bearing, in section where hatched, at the center line of the casing; Fig. 2 is an end view of the bearing; Fig. 3 is a side view of the saddle; Fig. 4 is a section on line 4—4 in Fig. 1; Fig. 5 is a section, like the upper part of Fig. 1, showing shells merely pressed into the saddle; Fig. 6 is a side view of one of the shells; and Fig. 7 is a transverse section of one of the oil-wipers and its supporting parts.

The saddle is shown as a substantially cylindrical hub $a$ having flat seats $b$ at opposite sides to fit the legs of the hanger, and spherical bosses $c$ upon the upper and lower sides which may be fitted to spherical sockets in the hanger; but such bosses are shown with central sockets $d$ by which the hanger-box can be supported upon the points of set-screws in the usual manner.

In the hanger-box illustrated in Fig. 1, the saddle is bored in its ends to fit snugly the exterior of the shells $g, g$, and in its middle portion is formed with screw-thread $f$ adapted to fit a thread $f'$ upon the inner end of each shell. The outer ends of the shells are formed with inwardly bent oil-retaining flanges $h$ adapted to clear the shaft and be open at their inner ends, such open ends being forced into close contact with one another when they are screwed into the saddle.

A collar $e$ is shown fitted within each shell contiguous to the flange $h$, being fitted tightly therein so as to positively retain its location. Each collar is formed at its inner end with a flat flange $e'$, and the cages $i$ which carry the rolls $j$ rotate close to the flanges $e'$ which guide them and hold them in place. The space between the flanges $e'$ and $h$ forms a wiper-chamber $h'$, and the space between the two flanges $e'$ forms the roll-space in which the rolls rotate around the shaft in direct contact with the interior of the shells.

The cages and rolls are inserted in the open ends of the shells before they are fitted into the saddle, and are proportioned so that the heads of the cages adjacent the joint of the two shells revolve close to one another, the two cages and sets of rolls fitting loosely between the flat flanges $e'$ near the opposite ends of the casing.

Oil-hole bushings $k$ are shown in Fig. 1 screwed through the wall of the saddle and the inner end projected into a hole in the shell which is indicated at $l$ in Fig. 6. The collars $e$ are inserted chiefly to carry oil-wipers, which rub continuously upon the shaft close to the end-flanges $h$ of the hanger-box. Such oil-wipers are shown in Fig. 7, consisting of a wiper-block $m$ fitted movably in a socket $n$ which is pressed into a hole in the collar $e$ and forced normally outward by a spring $o$. The wiper-block is provided with an enlargement $m'$ upon its inner end, which permits it to move as far as the surface of the shaft but not to project materially beyond that line, as it would interfere with the endwise insertion of the shaft in the hanger-box.

Fig. 5 shows the upper part of the saddle in section with bore extending straight through, and the inner ends of two shells forced therein and held from displacement only by the oil-hole bushings $k$. By proper workmanship, such shells may be pressed tightly into the bore of the saddle and the collars $e$ tightly pressed within the opposite ends of the shells to carry the oil-wipers, so that the union of the shells with the saddle and the union of the oil-wipers and the guide-flanges $e'$ is effected without rivets, welds, or other such fastenings.

The oil is supplied to the bearing through the oil-bushings $k$, so that in practice the rolls are fully bathed with the oil, and the oil thus conveyed to the shaft is prevented from working outside of the end-flanges $h$ by the constant rubbing of the oil-wipers lightly against the periphery of the shaft, which removes the oil therefrom and leads it downward into the chambers between the flanges $e'$ and $h$. From such chamber it escapes again into the roll-space through one or more holes $e^4$ formed in the flanges $e'$ adjacent to the oil-wiper.

The structure is adapted to be made wholly by "pressing and drawing" the parts from sheet-metal, excepting the rolls and the saddle, and the boxes can thus be manufactured with great cheapness, and with entirely interchangeable parts.

The oil-wiper is made separate from the collar $e$ and held therein by a head $e^5$, when the collar is forced into the shell.

It will be understood from the above, that the saddle or central hub of the hanger-box is made in one piece, and may be termed a one-piece saddle, and that the casing when formed of two shells may be termed a two piece casing.

Having thus set forth the nature of the invention what is claimed herein is:

1. In a roller-bearing hanger-box, the combination, with a saddle suitably bored to receive a casing, of a sheet-metal casing made in two shells each having an oil-retaining flange at its outer end and being open at its inner end, and such inner ends fitted in contiguity within the said saddle.

2. In a roller-bearing hanger-box, the combination, with a one-piece saddle having in its ends smooth bores to receive casing-sections and having a screw-thread in its middle portion, of a sheet-metal casing made in two shells, each open at its inner end and having a screw-thread upon such end for securing the shells in contiguity within the saddle.

3. In a roller-bearing hanger-box, the combination, with a saddle having in its ends smooth bores to receive casing-sections and having a screw threaded in its middle portion, of a sheet-metal casing made in two shells, each having an integral oil-retaining flange at its outer end having a screw-thread upon its inner end, and each shell having an oil-wiper within its outer end fitted to bear against the rotating shaft.

4. In a roller-bearing hanger-box, the combination, with a saddle suitably bored to receive a casing, of a sheet-metal casing made in two shells each having an oil-retaining flange at its outer end and being open at its inner end, and such inner ends fitted in contiguity within said saddle, a collar $e$ carrying an oil-wiper forced into each shell adjacent to the oil-retaining flange, and each collar having a flat flange adapted to guide the cages of the rolls within the bearing.

5. In a roller-bearing hanger-box, the combination, with a one-piece saddle suitably bored to receive a casing, of a sheet-metal casing made in two shells each having an oil-retaining flange at its outer end and being open at its inner end, and such inner ends fitted in contiguity within the said saddle, and oil-hole bushings inserted through the wall of the saddle into the said shells to retain the shells in said bore.

In testimony whereof I have hereunto set my hand in the presence of two subscribing witnesses.

CHARLES S. LOCKWOOD.

Witnesses:
E. WILLIAMS,
M. E. JAHN.